R. PROVOST.
Land-Rollers.

No. 134,311. Patented Dec. 24, 1872.

Witnesses.
Jno. D. Patten
Edmund Masson

Inventor.
Richard Provost.
By atty A. B. Stoughton.

UNITED STATES PATENT OFFICE.

RICHARD PROVOST, OF RARITAN, NEW JERSEY.

IMPROVEMENT IN LAND-ROLLERS.

Specification forming part of Letters Patent No. 134,311, dated December 24, 1872.

*To all whom it may concern:*

Be it known that I, RICHARD PROVOST, of Raritan, in the county of Somerset, and State of New Jersey, have invented certain new and useful Improvements in Field or Land Rollers; and I do hereby declare the following to be a full, clear, and exact description of the construction and operation of the same, reference being had to the accompanying drawing making a part of this specification, in which—

Figure 1:
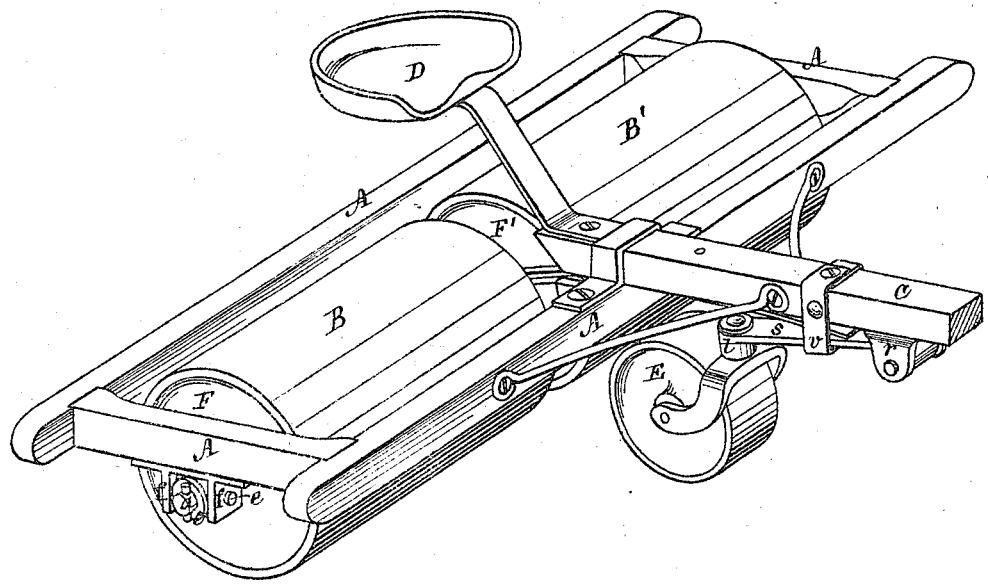
Figure 2:
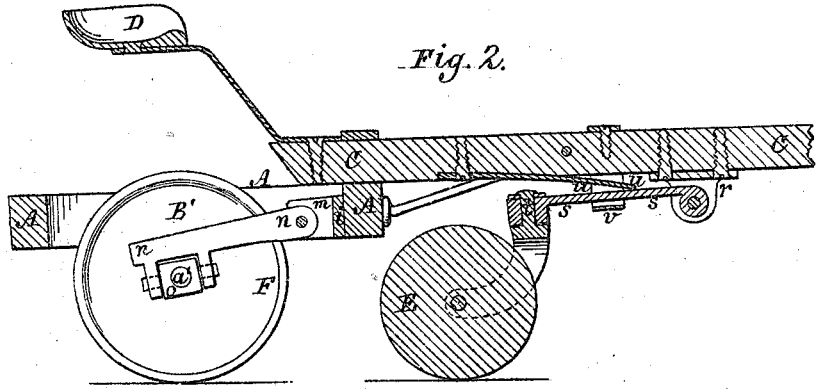

Figure 1 represents a perspective view of the roller; and Fig. 2 represents a section through the same at or near the line of the draft-pole.

My invention consists in the manner in which I have combined and arranged the rolls in a rigid frame, so that said rolls in passing over the ground may be free to conform to the undulations or inequalities thereof independent of the main frame.

To enable others skilled in the art to make and use my invention, I will proceed to describe the same with reference to the drawing.

The main frame of the machine is represented at A, and in this main frame is hung a pair of rollers, B B', by their journals $a$ $a'$, as follows: The journals $a$, at the extreme outer ends of the rollers, are supported in journal boxes or bearings $c$ that have trunnions $e$ upon them, so that said bearings may rock or roll, as its roller may rise and fall at its opposite or inner end in conforming to the inequalities of the ground as it moves over it. The boxes or bearings $c$ are supported in down-hangers $f$ that are attached to the end pieces of the main frame. The inner ends of the pair of rollers are differently hung, and as follows: On the front longitudinal piece of the main frame is attached a plate, $i$, which has lugs $m$ upon it, and to these lugs are hinged arms $n$ $n$, which project rearward of the machine, and which have upon their rear under sides rocking journal-bearings $o$, as seen in Fig. 2, in which the inner or adjacent journals $a'$ of the pair of rollers are supported, so that these adjacent ends of the pair of rollers may rise and fall with the hinged arms $n$ $n$, in which they are respectively hung, and also move endwise by the rocking of the journal-bearings, and thus the rollers have a free and yielding motion in the main frame, and independent of the main frame, while the main frame advances them over the ground. The tongue or draft-pole C is rigidly fastened and braced to the front of the main frame, and upon its rear end may be placed the driver's seat D. Underneath the pole C is hung a lug-plate, $r$, to the lugs of which is hinged an arm or bar, $s$, to the rear of which is pivoted, as at $t$, a caster-wheel, E, and a spring, $u$, attached to the pole C bears upon the caster-arm or bar $s$, so that the pole at or near its end has a spring support between itself and the caster-wheel, and is thus relieved of all sudden shocks or jars, and besides forms a comfortable position for the driver in his seat D. A clip, $v$, on the pole prevents the arm $s$ from dropping below a given point, while it is free to rise above that point.

The heads F F' of the rollers I propose to make of cast-iron, and the journals $a$ $a'$ united thereto of wrought-iron. These heads may be fastened to the rolls on the inside thereof by nuts, rivets, or keys, and the inner heads of the pair may be made heaviest to compensate for the weight of the frame.

Having thus fully described my invention, what I claim is—

In combination with a rigid main frame, one or more pairs of rollers when hung in pivoted and rocking boxes $o$, attached to the main frame, at their outer ends, and in pivoted and rocking boxes $o$, hung to or in the rear ends of the pivoted and swinging horizontal (or nearly so) arms $n$, at their inner ends, substantially as and for the purpose set forth.

RICHARD PROVOST.

Witnesses:
 FRED. J. FRELINGHUYSEN,
 THEO. FRELINGHUYSEN.